Feb. 23, 1971    L. E. LEAS    3,565,556
ROTARY INTERNAL COMBUSTION ENGINE
Filed Nov. 29, 1968    3 Sheets-Sheet 1

POSITION B                POSITION A

INVENTOR
LAWRENCE E. LEAS
BY
ATTORNEY

Feb. 23, 1971 L. E. LEAS 3,565,556
ROTARY INTERNAL COMBUSTION ENGINE
Filed Nov. 29, 1968 3 Sheets-Sheet 2

INVENTOR
LAWRENCE E. LEAS
BY
ATTORNEYS

Feb. 23, 1971    L. E. LEAS    3,565,556
ROTARY INTERNAL COMBUSTION ENGINE
Filed Nov. 29, 1968    3 Sheets-Sheet 3
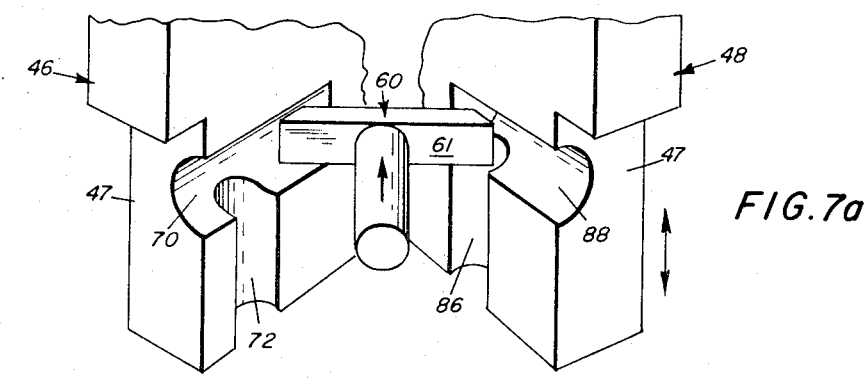
FIG.7a
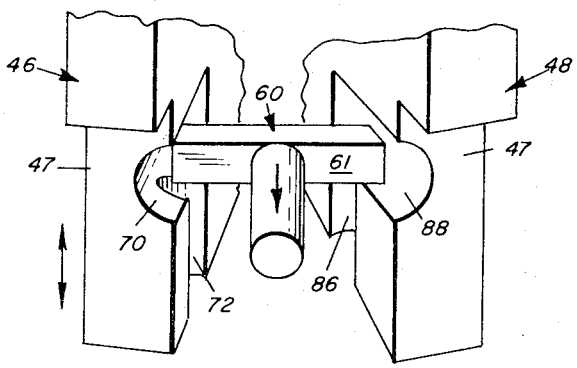
FIG.7b
FIG.8a
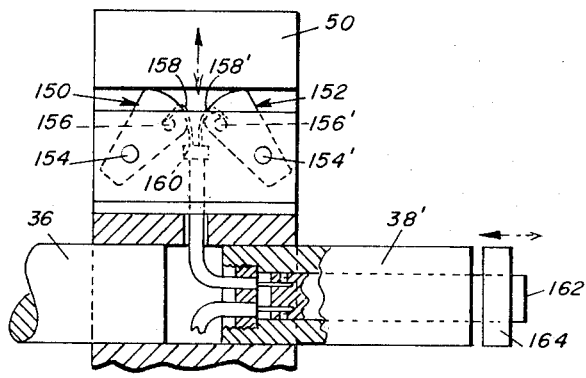
FIG.8b
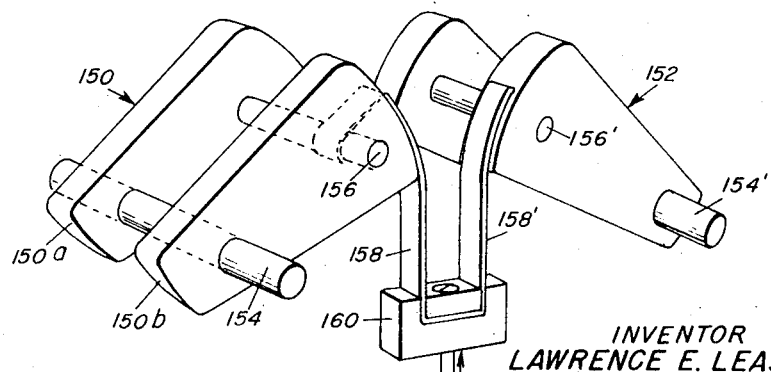
INVENTOR
LAWRENCE E. LEAS
BY Robillard and Byrne
ATTORNEYS Patented Feb. 23, 1971

3,565,556
ROTARY INTERNAL COMBUSTION ENGINE
Lawrence E. Leas, Simi, Calif., assignor to Energy Research Corporation of America, Columbia City, Ind., a corporation of Delaware
Filed Nov. 29, 1968, Ser. No. 780,055
Int. Cl. F02b 53/00
U.S. Cl. 418—16                                     7 Claims

ABSTRACT OF THE DISCLOSURE

An engine comprised of a casing having an elliptical chamber, a cylindrical rotor within said chamber and defining first and second crescent-shaped chambers therewith, sets of vanes slidably received in said rotor and cooperating with the interior surface of said chambers to sequentially form intake, compression, combustion and exhaust chambers therebetween, and control means for varying the compression ratio between said vanes, fuel inlet passageway through said casing communicating with said combustion chamber, and an air inlet passageway through said casing communicating with said intake chamber.

---

This application relates generally to internal combustion engines and more particularly to a double-vane rotary power unit which operates on an Otto or diesel cycle.

A primary objective of this invention is to provide a rotary engine which uses a plurality of pairs of vanes for sequentially forming the intake, compression, power and exhaust chambers and having means whereby the compression ratio of the engine can be changed whereby fuels of varying performance characteristics can be utilized.

Another important objective of this invention is to provide a rotary internal combustion machine with three or more power cycles per revolution whereby a continuous and even flow of power is transmitted to its drive shaft.

Another important objective of the invention is to provide an engine which exhausts a reduced amount of pollutants into the atmosphere because of its ability to utilize a high air-to-fuel relationship whereby fuller combustion of the fuels take place. The variable compression ratio characteristic permits coal-derived fuels and other heretofore considered marginal fuels to be utilized.

The prior art engines, which include reciprocating, turbo-jet and jet engines, do not efficiently permit the combustion of fossil fuels. Additionally, such engines have a low combustion efficiency and exhaust a great deal of pollutants into the atmosphere. Most of these prior art engines require expensive, highly refined, and tailored fuels to yield high performance. Because of the present invention's ability to change its compression ratio, the engine hereof can efficiently use high density fuels such as those derived from coal, tar sands and shale oil. Another very important objective of this invention is to provide an internal combustion engine which can change its compression ratio during the operation of the engine.

A further objective of this invention is to provide improved vane control means whereby the vanes are extended and retracted from the rotor in an efficient and trouble-free manner.

A still further objective of this invention is to provide a vane design wherein the combustion forces will not materially disturb the vane control apparatus.

These and other objects of the invention will become more apparent to those skilled in the art by reference to the following detailed description when viewed in light of the accompanying drawings wherein:

FIGS. 7a–7b are diagrammatic views showing operation; and

FIGS. 8a and 8b are diagrammatic views showing another mode of varying compression ratio.

Figure 1:
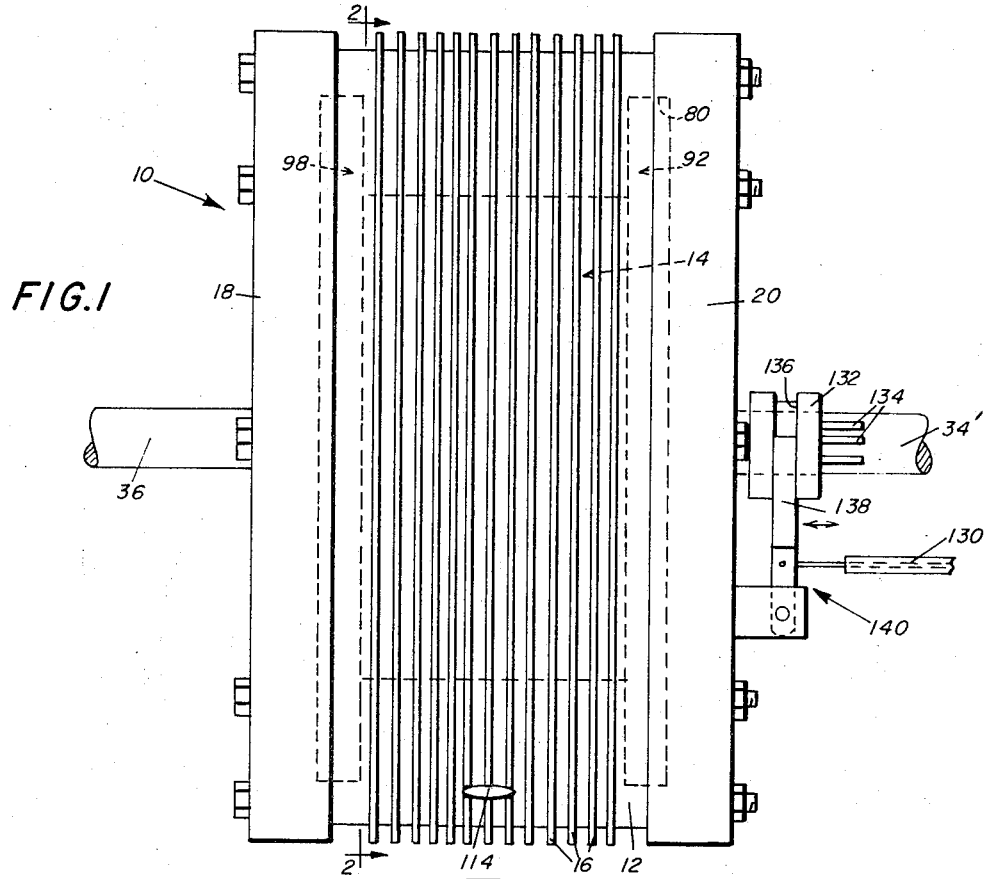
FIG. 1 is a side elevation of the engine of this invention.

Referring now to the drawing wherein like numerals indicate like elements, the numeral 10 indicates the engine of this invention. The invention consists principally of a casing 12 and a rotor 14. The casing 12 is formed with fins 16 on its exterior surface for cooling purposes. The casing 12 is enclosed by end plates 18 and 20. The casing and end plates define a chamber 21 having a generally elliptical interior surface 22 formed by arcuate surfaces 24 and 26 and arcuate dwell surfaces 28 and 29. Each of these arcuate surfaces has a diameter equal to the circular surface 30 of rotor member 14. The rotor 14 thus divides chamber 22 into a pair of crescent shaped chambers 32 and 34.

A drive shaft 36 is journaled through end plate 18 and is keyed to rotor 14 at 38. In the embodiment of FIG. 1, a shaft 34' is journaled through end plate 20 and its inner end is spaced from the drive shaft 36 interiorly of the rotor.

The rotor 14 is formed about its peripheral surface with vane receiving slots 40, 42 and 44. Each of the slots slidably receives a leading vane 46 and a trailing vane 48. Disposed in the slots between each pair of vanes are compression ratio bearing plates 50 and T-shaped support plates 52. Each support plate is slotted along its upper surfaces at 54 to receive the plate 50 and at its lateral edges is formed with grooves 56 and 58 to receive vane control pins 60 and 62. Springs 65 are provided to bias the vanes outwardly.

Figure 2:
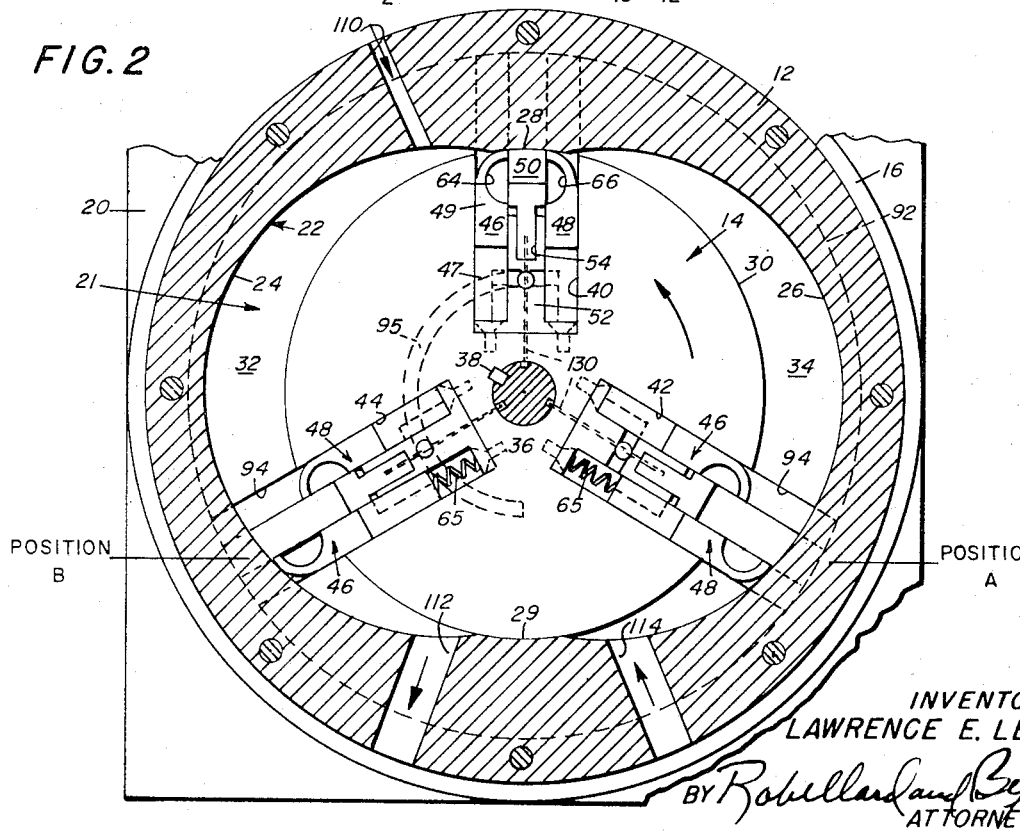
FIG. 2 is a cross-section along the line 2—2 of FIG. 1.
Figure 3:
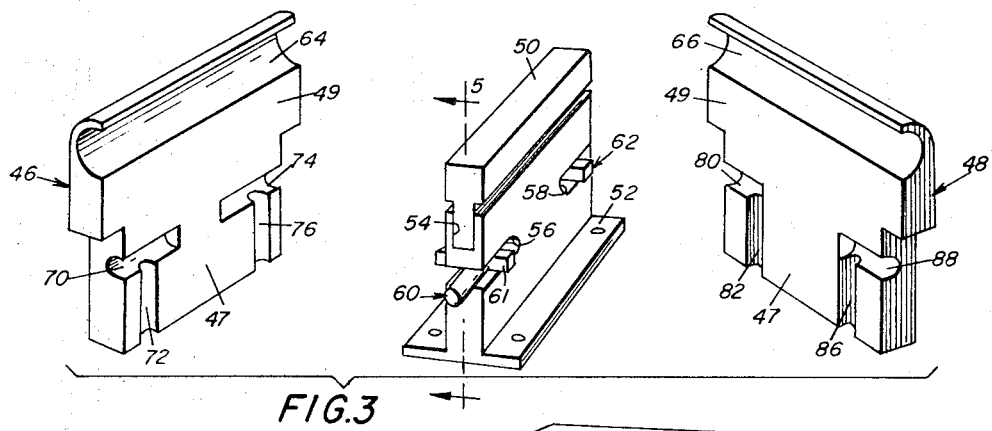
FIG. 3 is an exploded view showing vane construction.
Figure 4:
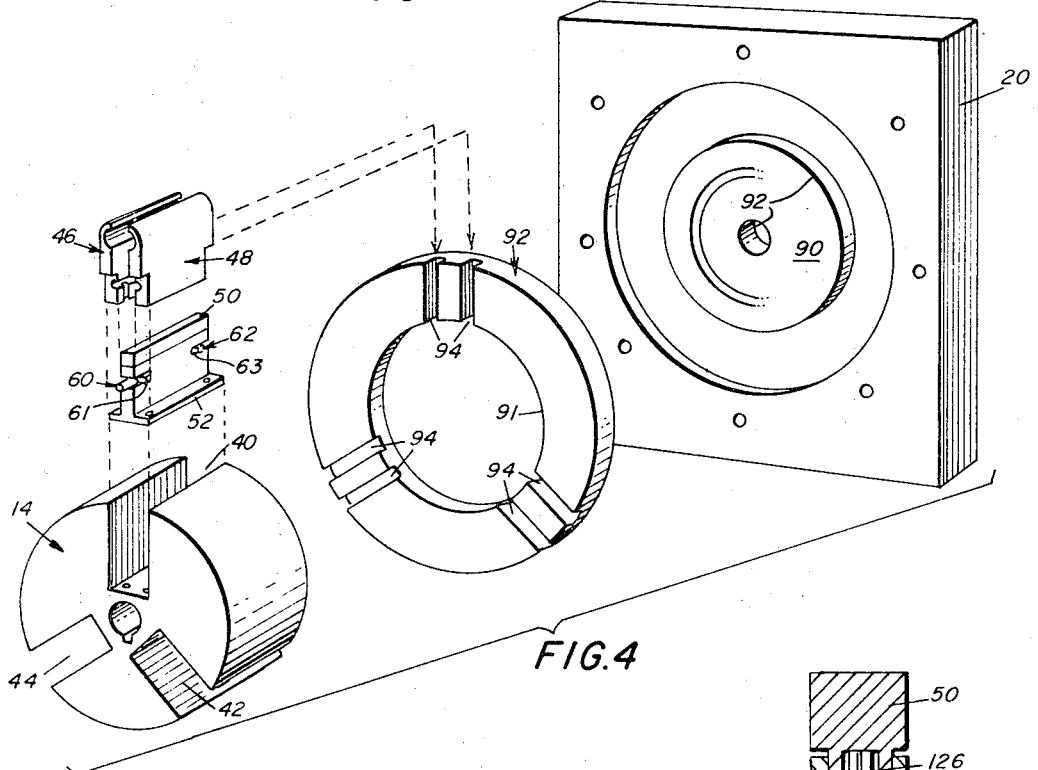
FIG. 4 is a partial exploded view of the interior of the motor assembly.

The vane assemblies are identical and only one will be described in detail. Assume for purposes of illustration that the rotor 14 is moving counterclockwise as viewed in FIG. 2. The forward or leading vanes will be referred to by the numeral 46 and the trailing vane as 48. The leading vane 46 is formed at its upper end with a half-cylindrical compression groove 64. The trailing vane 48 is formed with a half-cylindrical depression at groove 66 which is juxtaposed opposite the groove 64. Each of the vanes is comprised generally of a base 47 and an elongated upper member 49 that overhangs its base. One edge of the base 47 of the leading vane is formed with a horizontal slot 70 which intersects with a vertical slot 72 in the base member. The opposite edge of the vane is formed with horizontal slot 74 which intersects with a vertical slot 76. As can be seen best in FIG. 3, the slots of vane 46 are generally T-shaped with the vertical slots 72 and 76 relatively close to the edges of the base.

The base of the trailing vane 48 is formed with a pair of L-shaped slots, the first of which is comprised of grooves 80 and 82 in opposing relationship to slots 74 and 76. The second is formed with the horizontal slot 84 and the vertical slot 86 in opposing relationship to slots 70 and 72. These slot networks are adapted to receive outer ends of the cross-members 61 and 63 of the pins 60 and 62.

The end plate 20 is counterbored at 90 to receive an annular rotor plate. The rotor end plate 92 has formed along its inner surface radial guide grooves 94 to slidably receive the overhangs of the vane members 46 and 48 while they reciprocate in a fashion which will be more fully understood hereinafter. The other end plate 18 is likewise counterbored at 96 to receive a rotor end plate 98 which is the mirror-image of rotor end plate 92. The end plate 20 is formed with an inward hub 90 which is nested within the opening 91 of rotor end plate 92 and is formed with a central opening 92 to receive the accessory shaft 38'. Formed in the inner surface of the hub member is a 180° arcuate groove 95 which is radially disposed from the center of the hub at a distance to receive the tip of the pin member 62.

As stated above, the stator plate 18 is the mirror-image of the stator plate 20. Plate 18 has a groove 96 in the same cylindrical plane as groove 95. The groove 96 is adapted to receive the tips of the pin member 60. The grooves 96 and 95 taper to the surfaces of their hubs so that pins smoothly enter and leave as the rotor rotates.

Figure 5:
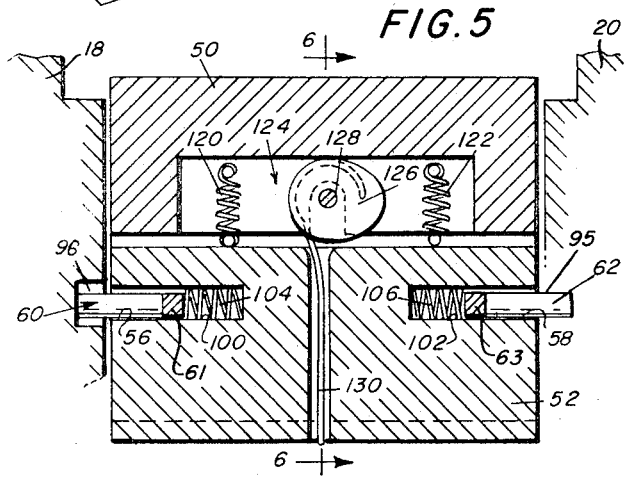
FIG. 5 is a cross-sectional view along the line 5—5 of FIG. 3.
Figure 6:
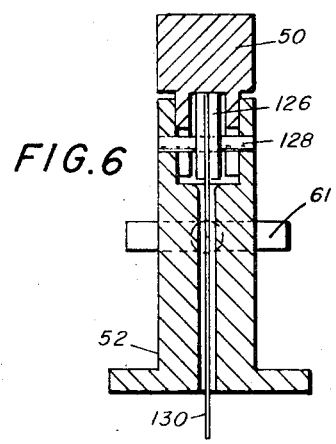
FIG. 6 is a cross-sectional view along the line 6—6 of FIG. 5.

As seen best in FIG. 5, grooves 56 and 58 are formed with spring-receiving bores 100 and 102 which receive the bias springs 104 and 106. The bias springs urge the pins 60 and 62 outwardly toward the grooves 96 and 95 of the respective hub members.

The control of vane movement can best be understood by referring to FIGS. 7a and 7b. As seen in FIG. 7a, the pin position is shown just after the vanes depart from the dwell surface 29. Here the leading vane 46 is nested and the trailing vane 48 extended. The pins 60 and 62 are pushed inwardly because of the absence of a groove, and the cross members 61 and 63 are displaced inwardly of the grooves 72 and 76. This same inward depression disposes the cross members 61 and 63 over the grooves 82 and 86 of the trailing vanes 48. This is the vane position shown as position A in FIG. 2. In position B, that is after the vanes depart from surface 28, the opposite condition pertains. The pins 60 and 61 move outwardly into grooves 95 and 96 (FIG. 7b) and the cross-members are disposed over the slots 72 and 76 of the leading vanes and are displaced from the slots 82 and 86 of the trailing vanes. The purposes of these operations will be more fully understood when the stroke of the pump operation is described.

Referring again to FIG. 2, it can be seen that the casing 12 is formed with a fuel injection inlet 110, exhaust port 112 and an air inlet port 114. As a pair of vanes departs from surface 29, the leading vane is nested and the trailing vane is extended. Compression ratio is variable by displacing a certain volume of the compression chamber with a selected position of plate 50. Air captured in front of the trailing vane 48 is gradually and progressively compressed until it reaches dwell surface 28 at which time maximum compression has taken place. At this point, surfaces 64 and 66 enclose a compressed body of air. Just beyond the point of maximum compression fuel is injected in the chamber defined between blades via the port 110. An explosion will occur, driving the vane 46 in the direction of B. Back pressure is sealed by the surface 30 of the rotor against the dwell surface 28. Note that because of the half-cylindrical shape of groove 64 the pressure tending to push it outwardly against the surface 24 will be equalized by the pressure tending to nest it in the slot 44. In other words, the explosion pressures are equalized and the explosion forces are utilized to develop the rotary force. The air captured in front of the leading vane 46 is exhausted through the port 112 and as the vanes traverse the surface 29, another power stroke cycle is commenced.

As stated heretofore, the engine of this invention has a capability of using a great variety of fuels because its compression ratio can be automatically changed either before or during operation. The plate 50 is shown diagrammatically in FIGS. 8a and 8b. Here a pair of eccentric assemblies 150 and 152 are utilized. The assembly 150 is comprised of identical cams 150a and 150b. A shaft 154 joins these members and is mountable on a shaft similar to 128. The plates are also joined by a pin 156. The plates of assembly 152 are joined by pin 156'. Straps 158 and 158' are respectively joined to pins 156 and 156' and lead to a joiner 160. A push-pull cable is connected to the joiner and extends through a hollow accessory shaft 38' to a sliding control rod 162. The control rod rotates with the accessory shaft. A thrust bearing 164, which does not rotate, is keyed to the control rod. A longitudinal movement of the thrust bearing will cause the push-pill cable to rotate the cams which, in turn, will permit variable displacement.

In a general manner, while there have been disclosed effective and efficient embodiments of the invention, it should be well understood that the invention is not limited to such embodiments, as there might be changes made in the arrangement, disposition and form of the parts without departing from the principles of the present invention as comprehended within the scope of the accompanying claims.

I claim:

1. An engine comprising,
   a casing having an interior surface defining a generally elliptical chamber,
   a cylindrical rotor rotatably received in said chamber and having diametrically opposite surfaces in engagement with said surface of said chamber at its least diameter and forming first and second crescent-shaped chambers therewith,
   said rotor having a plurality of radial grooves in the surface thereof,
   a plurality of pairs of vanes slidably received in said grooves for cooperating with said elliptical surface and sequentially forming therewith intake, compression, combustion and exhaust chambers as said rotor rotates with respect to said casing,
   passageway means to admit fuel into said combustion chamber and air into said compression chamber,
   control means sequentially extending the forward vanes of said pairs and retracting the rearward vane of said pairs as they pass through said first crescent-shaped chamber and retracting said forward vanes extending said rearward vanes as said pairs pass through said second crescent-shaped chamber, and a compression ratio varying means is disposed between said pairs of vanes for varying the volume of the chambers between said forward and rearward vanes.

2. The engine of claim 1 wherein said compression chambers are at their minimum volume between the forward and rearward vanes of each of said pairs as they pass the surfaces of least diameter of said elliptical chamber.

3. The engine of claim 1 wherein said compression ratio varying means is a plate.

4. The engine of claim 3 wherein second control means connected to said plate adjusts the position of said plate from a location outside of said casing.

5. The engine of claim 4 wherein said second control means comprises an eccentric cam means rotatable in said slots between the bottom of said slots and the bottoms of said plates, a push-pull cable affixed to each of said cams a distance from its axis of rotation,
   a hollow shaft extending into said rotor and coaxial therewith,
   said rotor having bores leading from said slots to the interior of said shaft,
   a slug member slidably received in said hollow shaft,
   means to slide said slug with respect to said hollow shaft, and
   push-pull cable means connecting said slug and said eccentric cam, whereby the said eccentric is rotated upon a movement of said slug.

6. The engine of claim 1 wherein first and second end plates of said casing enclose said chamber, said first end plate having a first arcuate groove of 180° formed on the interior surface thereof, said second end plate having a second arcuate groove of 180° formed in its interior surface in the same cylindrical plate as said first arcuate groove but displaced 180° therefrom, said vanes having a slot network at their ends opposing said grooves and said control means includes pin means interengageable with said grooves and said slot networks.

7. The engine of claim 6 wherein spring means normally bias said vanes outwardly against said elliptical surface.

References Cited

UNITED STATES PATENTS

| 1,324,759 | 12/1919 | Berglof | 123—16 |
| 1,609,686 | 12/1926 | Blanding | 123—48(A) |
| 2,062,576 | 12/1936 | Johnson | 123—16 |

FOREIGN PATENTS

| 710,190 | 6/1931 | France | 123—16 |
| 1,144,073 | 4/1957 | France | 123—16 |
| 18,022 | 8/1912 | Great Britain | 123—16 |

ALLAN D. HERRMANN, Primary Examiner

U.S. Cl. X.R.

418—263